(12) United States Patent
Kongmark et al.

(10) Patent No.: US 7,935,254 B2  
(45) Date of Patent: *May 3, 2011

(54) REACTOR FOR SIMULTANEOUS SEPARATION OF HYDROGEN AND OXYGEN FROM WATER

(75) Inventors: Nils Kongmark, Ferney-Voltaire (FR); Klaus Röhrich, Divonne les Bains (FR); Harald Wirth, Farges (FR)

(73) Assignee: H2 Power Systems Ltd, Douglas (IM)

( * ) Notice: Subject to any disclaimer, the term of this patent is extended or adjusted under 35 U.S.C. 154(b) by 502 days.

This patent is subject to a terminal disclaimer.

(21) Appl. No.: 11/762,183

(22) Filed: Jun. 13, 2007

(65) Prior Publication Data

US 2007/0269687 A1     Nov. 22, 2007

Related U.S. Application Data

(63) Continuation of application No. PCT/IB2004/052827, filed on Dec. 16, 2004.

(51) Int. Cl.  
*B01D 63/06* (2006.01)  
*B01D 53/22* (2006.01)  
*B01D 61/00* (2006.01)

(52) U.S. Cl. ......... 210/321.64; 210/321.87; 210/321.88; 210/321.89; 96/4; 96/10

(58) Field of Classification Search .............. None  
See application file for complete search history.

(56) References Cited

U.S. PATENT DOCUMENTS 4,233,127 A * 11/1980 Monahan ............... 204/157.5  
4,254,086 A * 3/1981 Sanders ................... 422/187  
4,332,775 A * 6/1982 Genequand et al. ......... 422/112  
(Continued)

FOREIGN PATENT DOCUMENTS

FR     2839713     11/2003  
(Continued)

OTHER PUBLICATIONS

Steinfeld et al., "A Solar Chemical Reactor for Co-production of Zinc and Synthesis Gas," Energy, vol. 23, No. 10, pp. 803-814, 1998.

(Continued)

*Primary Examiner* — Krishnan S Menon  
(74) *Attorney, Agent, or Firm* — Edwards Angell Palmer & Dodge LLP; Barry Kramer; Gabriel J. McCool

(57) ABSTRACT

We disclose a device for the production of hydrogen from water using heat. The device employs thermal water splitting and works essentially without electricity. It is based on the concept of a membrane reactor with two kinds of membranes allowing the separation of hydrogen and oxygen simultaneously in stoichiometric quantities from the reactor volume. The device has a special geometry resulting in a temperature distribution inside the reaction chamber to accommodate the use of hydrogen selective membranes. The device will help to reduce the need for hydrogen transport and storage as it will be rather compact for on-site use in households, small factories or gas stations. The use of the device in mobile applications is conceivable. The heat source of the device as described is combustion of a hydrocarbon using porous burner technology; however the device can be modified to exploit any other heat source, especially solar radiation.

7 Claims, 1 Drawing Sheet

U.S. PATENT DOCUMENTS

| | | | |
|---|---|---|---|
| 4,696,809 A * | 9/1987 | Vialaron et al. | 423/579 |
| 6,521,205 B1 * | 2/2003 | Beck | 423/658.2 |
| 2004/0050801 A1 | 3/2004 | Lee | |
| 2006/0048808 A1 * | 3/2006 | Ruckman et al. | 136/206 |

FOREIGN PATENT DOCUMENTS

| | | |
|---|---|---|
| GB | 1532403 | 11/1978 |

OTHER PUBLICATIONS

Steinfeld and Palumbo, "Solar Thermochemical Process Technology," Encyclopedia of Physical Science & Technology, R.A. Meyers Ed., Academic Press, vol. 15, pp. 237-256, 2001.

* cited by examiner

REACTOR FOR SIMULTANEOUS SEPARATION OF HYDROGEN AND OXYGEN FROM WATER

CROSS REFERENCE TO RELATED APPLICATIONS

This application is a Continuation application of PCT/IB2004/052827 filed Dec. 16, 2004 and is incorporated by reference herein in its entirety.

BACKGROUND OF THE INVENTION

Hydrogen is the fuel of the future. Although many developments in the field of fuel cells, hydrogen combustion engines, and related technologies are going on, hydrogen consumers are still far away from being economically viable. Hydrogen transport and storage are further obstacles to a quick change from a fossil-driven to a hydrogen-driven economy.

SUMMARY OF THE INVENTION

The disclosed device is based on thermal water dissociation in a heat and mass transfer optimized membrane reactor for simultaneous, stoichiometric oxygen and hydrogen separation. As it is a stand-alone small or medium-scale hydrogen production plant, the device will help to reduce the need for hydrogen transport and storage. Consequently, it will help to accelerate the introduction of hydrogen as an energy vector, and it is therefore expected to be of substantial economic importance.

The hydrogen produced by the device is clean, the only contaminant being water. It can be fed right away to a fuel cell and thus can be combined with fuel cell stacks to co-generate heat and electricity for households or small factories. The use of the device in mobile applications is conceivable, and very compact versions can be employed in fuel cell cars.

The recent evolution within the material sector and especially the development of new types of membranes has made it possible to manufacture economically viable devices like the disclosed one with a long lifetime.

The device can be realised as disclosed using combustion as heat source. The available heat produced in the combustion is increased using the hot oxygen from the water-splitting process separated by the device. Even though burning acetylene with the oxygen produced by the device is thermally most favourable, other gases like butane, natural gas or methanol have high enough flame temperatures (see Table 2) to make hydrogen by thermolysis.

The exhaust gas from the combustion will contain a minimum of carbon oxides because of the optimization of heat and mass flows. Other exhaust products are only water and possibly some hydrocarbons due to imperfections in the combustion.

The device can be modified to use solar radiation as heat source and thus produce hydrogen from water without any emission of carbon oxides.

DETAILED DESCRIPTION

Figure 1:
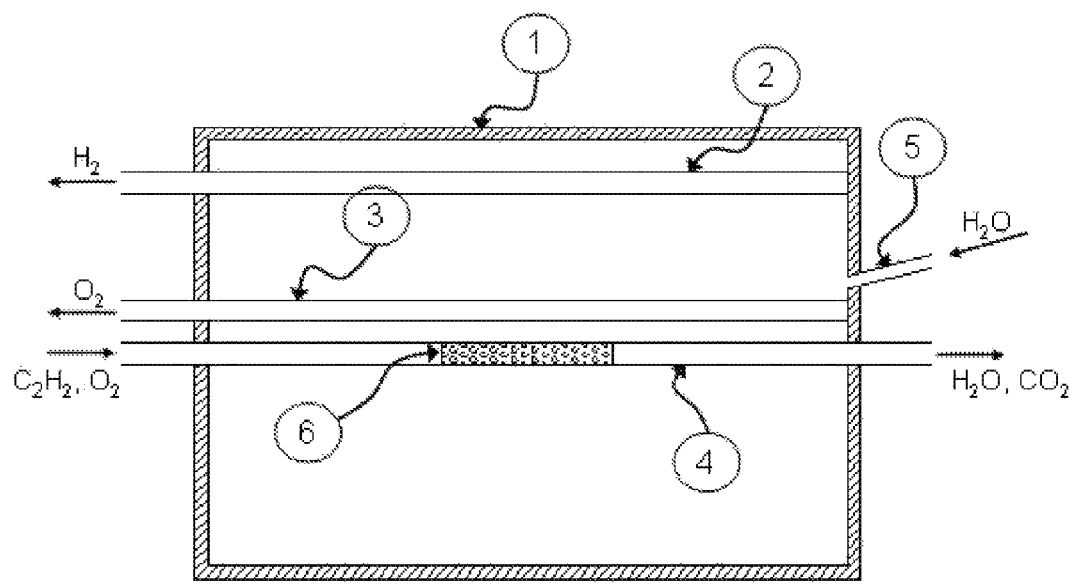
FIG. 1 is a schematic cross-sectional side view of an embodiment of the reactor of the invention.

FIG. 1 shows a possible embodiment of the device. The device is a thermally insulated, cylindrical reactor chamber (1). Passing through the reactor chamber, and parallel to its axis, are three types of one or more tubes with specific functions:

1. one or more substantially gas impervious, solid tubes used as a membrane for selectively passing hydrogen (2),
2. one or more substantially gas impervious, solid tubes used as a membrane for selectively passing oxygen (3), and
3. one or more substantially gas impervious, solid tubes containing the heat source (4).

Figure 2:
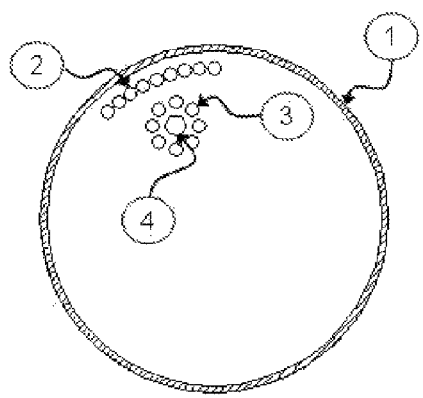
FIG. 2a is a schematic cross-sectional end view of another embodiment of the reactor of the invention.
FIG. 2b is a schematic cross-sectional end view of yet another embodiment of the reactor of the invention.
Figure 2:
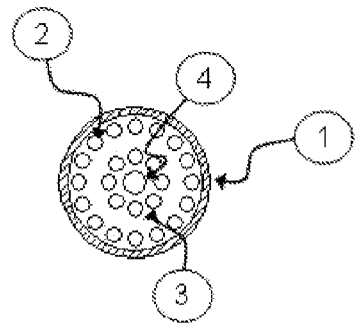

Arrangements with several heating tubes or with just one are illustrated in FIGS. 2a and b. Significant is the positioning of the oxygen selective membranes around the heat source to shield the remaining reactor volume from direct, radiative heat transport. However, other geometrical configurations like those shown in FIG. 2 are possible.

The reactor chamber contains some water, and it has several water inlets (5).

A gas is burned inside the heating tubes (6). Heat sources may be tubular, porous burners, which optimise combustion inside small volumes. Acetylene is chosen as an example, indicated in the Figure, but any other gas reaching sufficiently high flame temperatures may be used as well. The heat is transferred via the walls of the heating tubes, and by conduction, convection and radiation, to the water inside the reactor and also to the other components of the device.

The water inside the reactor will eventually vaporize and ultimately dissociate into its components: atomic and molecular hydrogen, oxygen, and hydroxyl $OH^-$. Other possible combinations of hydrogen and oxygen are negligible, their abundance being below the ppm level for practical temperatures up to and over 2500 K depending on the thermodynamic conditions inside the reactor.

The oxygen selective membrane tubes are placed closest to the heat source, i.e., in the region where the temperature and thus the degree of water dissociation is highest and where there is a sizeable oxygen partial pressure. The oxygen passes the membrane due to the concentration difference between the inside of the reactor and the inside of the membrane tube. The separated oxygen is directed to the gas burner to attain the highest possible combustion temperature and thus the highest possible degree of water dissociation.

Additionally, the oxygen selective membrane tubes serve as a heat shield between heat source and hydrogen membrane tubes and reactor walls.

The tubes are placed closer to the reactor walls. The reactor wall and possibly the hydrogen membrane tubes are cooled. The temperatures in the region of the hydrogen membrane tubes are accordingly much lower than the temperatures in the water dissociation area. To assure optimized functioning of the hydrogen selective membranes, the temperatures are typically around or below 1000° C.; at higher temperatures oxygen transfer will start and worsen the selectivity, with decreasing temperatures hydrogen transfer rates will diminish.

The surplus hydrogen in the dissociation region after oxygen was extracted will diffuse throughout the reactor. Hydrogen is extracted to counteract the loss of separated oxygen and thus keep the absolute hydrogen to oxygen ratio in the reaction chamber balanced, i.e., in the molecular ratio of 2:1.

Inside the gas selective membrane tubes must be a lower partial pressure of the respective gas than outside, to allow the membrane to function. This can be assured e.g. by connecting the gas selective membrane tubes to pumps. By pumping, a gas concentration gradient across the membrane wall is created. Hydrogen and oxygen will pass the respective membranes, and the gases can be directed to storage or to consumers. A small turbine in the exhaust gas stream can provide the necessary electricity for the oxygen and hydrogen pumps.

Water is injected to compensate for the extracted oxygen and hydrogen. The water inlets are arranged such that water droplets or cold vapour cool all joints between functional tubes and reactor chamber. The water injection may as well be realised via vapour penetration through the reactor walls. The water or steam, which is injected, can be preheated as part of the thermal insulation and with heat from the exhaust gas of the burners.

The amount of hydrogen and oxygen extracted is controlled to be 2 to 1, in their stoichiometric ratio in water. Thus, the reactor is refuelled with exactly the corresponding amount of water.

The required temperatures for water dissociation can be obtained with a variety of gases with sufficiently high flame temperature. Sufficiently high is defined by the desired degree of water dissociation. Table 1 shows, for a pressure of 1 bar, the degree of water dissociation (mass fraction in percent) and the hydrogen partial pressure at different vapour temperatures. The values have been calculated using STANJAN software [1].

TABLE 1

Water dissociation in weight percent at different temperatures and corresponding hydrogen partial pressure.

| 1500 K | 2000 K | 2200 K | 2273 K | 2500 K | 3000 K | 3500 K |
|---|---|---|---|---|---|---|
| 0.02% | 0.70% | 1.37% | 2.49% | 5.89% | 24.64% | 62.36% |
| 0.2 mbar | 6 mbar | 14 mbar | 22 mbar | 50 mbar | 200 mbar | 454 mbar |

The disclosed device separates oxygen from water. This oxygen is conducted into the burner to improve the combustion in terms of (a) cleaner exhaust and (b) higher flame temperature.

(a) "Cleaner" is understood as a reduction of $NO_x$ and hydrocarbons in the exhaust gas. The exhaust gas, which will mainly contain $CO_2$ and water, can be combined with the hydrogen from the device to feed for example a Fischer-Tropsch process. The carbon dioxide can be trapped e.g. by letting the exhaust gas bubble through a limewater bath.

TABLE 2

Approximate flame temperatures in air and in oxygen for a-selection of gases.

| | approx. flame temperature | |
|---|---|---|
| | in air [° C.] | with $O_2$ [° C.] |
| unleaded gasoline | 2030 | 2260 |
| hydrogen | 2100 | 2800 |
| methanol | 1870 | 2200 |
| ethanol | 1920 | 2380 |
| methane | 1960 | 2800 |
| ethane | 1960 | 2810 |
| butane | 1970 | 2830 |
| propane | 1980 | 2820 |
| acetylene | 2400 | 3100 |

(b) Increasing the combustion temperature is important. Flames of most gases in air reach only temperatures around 2000° C. (see Table 2), whereas flame temperatures can rise over 3000° C. when the gas is burnt with oxygen. Depending on the gas used, stored oxygen will need to be supplied during start-up of the device.

There are no ballast gases and the energy to be supplied is just that needed to heat and dissociate the fresh water, and that needed to maintain the working point thermal equilibrium situation.

The thermal efficiency of the device can be improved if hot steam from a hydrogen consumer (fuel cell, hydrogen combustion engine) is used to replenish the device.

Hydrogen and oxygen production may be increased by adding a catalyst into the reactor. An example are catalysts with two or more oxidation states like the Zn—ZnO or the FeO—$Fe_2O_3$ systems, where the Zn or the FeO reduces the water molecule while the ZnO or the $Fe_2O_3$ releases the oxygen at high temperatures.

Hydrogen and oxygen production may also be increased by using catalytic membranes, which split the water molecules when they come into contact with the membrane surface. Titanium and Cerium oxides have exhibited catalytic effects when integrated into high temperature ceramic membranes [2].

Without catalyst or catalytic membranes, the working point temperature is well above 2000° C. For example at 2227° C. (2500 K) and a pressure of 6.75 bar inside the reactor, the hydrogen partial pressure is about 169 mbar.

Materials, which stand these conditions, are rare. However, today materials are available for both heating tubes and burner as well as for the gas separating membranes:

For the heating tubes, graphite or zirconia with a sufficiently protective coating by some high-melting oxide is a first choice.

Oxygen separation is possible to be carried out with a high yield at temperatures starting at about 1200° C. Oxygen separation due to ionic conduction increases with temperature for many refractory materials.

Using existing membrane materials, the hydrogen selective membrane tubes have to be placed in a region where the temperature is of the order of or below 1000° C., which is near the reactor walls or even integrated into the reactor walls. Hydrogen separation is possible to be carried out at a rate of the order of 10 $cm^3/cm^2$/min based on results with mixed-conductance cermet membranes [2].

The low temperature near and of the reactor wall allows using cheap and abundant materials like alumina to build the reactor components.

REFERENCES

[1] STANJAN is chemical equilibrium software created by Prof. Wm. C. Reynolds. Free versions are available on the Internet.
[2] see for example: U. Balachandran, T. H. Lee, S. Wang, and S. E. Dorris, "Use of Mixed Conducting Membrane to Produce Hydrogen by Water Dissociation", Int. J. Hydrogen Energy 29 (2004) 291-296.

The invention claimed is:

1. A device for separating water into hydrogen and oxygen, comprising a reaction chamber and, located within said reaction chamber, a heating system, one or multiple substantially gas impervious membrane(s) for selectively passing oxygen, one or multiple second substantially gas impervious membrane(s) for selectively passing hydrogen, and a mechanism for passing water or steam into said reaction chamber, wherein of the oxygen selective membrane(s) is/are positioned around the heating system in the region of water dissociation so as to shield the heating system and to control and to enhance the temperature gradient, and between the hydrogen selective membrane(s) and the heating system so as to assure and optimize the proper functioning of the hydrogen selective membrane(s) in regions of cooler temperatures.

2. The device of claim 1, wherein the heating system, the selective oxygen membrane(s) and the selective hydrogen membrane(s) comprise tubes passed through the reaction chamber.

3. The device of claim 2, wherein the mechanism for passing water or steam into the reaction chamber comprises water inlets arranged such that water droplets or cold vapour cool joints between the tubes and the reaction chamber.

4. The device of claim 2, wherein the heating system consists of one or multiple porous burners contained in the tubes.

5. The device of claim 2, wherein the hydrogen selective membrane tubes are integrated into the reaction chamber walls.

6. The device of claim 1, wherein the reaction chamber, the gas impervious membrane(s) for selectively passing oxygen, the gas impervious membrane(s) for selectively passing hydrogen or both said membranes contain reactant(s) or catalyst(s) to favour the dissociation of steam into hydrogen and oxygen already at lower temperatures.

7. The device of claim 1, wherein the heating system is a combustion heating system.

* * * * *